United States Patent [19]

Noakes

[11] 4,021,670
[45] May 3, 1977

[54] SEALABLE HIGH COUNTING EFFICIENCY LIQUID SCINTILLATION VIALS

[76] Inventor: John E. Noakes, Rte. 3 Barnett Shoals Bar H Estates, Athens, Ga. 30601

[22] Filed: Sept. 10, 1975

[21] Appl. No.: 612,087

[52] U.S. Cl. .............................. 250/328; 215/200; 215/228; 215/258; 215/355

[51] Int. Cl.² ...................... G01T 1/204; G01T 7/08

[58] Field of Search ........... 250/328; 215/200, 226, 215/228, 258, 272, 355

[56] References Cited
UNITED STATES PATENTS

| | | | |
|---|---|---|---|
| 3,025,988 | 3/1962 | Williams | 215/355 X |
| 3,160,269 | 12/1964 | Davidson | 215/228X |
| 3,883,741 | 5/1975 | Thumim | 250/328 |

Primary Examiner—Archie R. Borchelt
Attorney, Agent, or Firm—John G. Schenk

[57] ABSTRACT

Liquid scintillation counters are now the instruments of choice for use in counting most radioactive samples. While preferred, liquid scintillation counters are still subject to the disadvantage of their inability to effect high photon detection from within the counting vial, and of their inability to retain volatile cocktail solvents within the instrument for relatively long periods. A liquid scintillation counter is provided having a sample vessel with means which increase photon impingement on the photosensing device of the instrument, and with closure means better preventing escape of volatile materials.

20 Claims, 6 Drawing Figures

SEALABLE HIGH COUNTING EFFICIENCY LIQUID SCINTILLATION VIALS

BACKGROUND OF THE INVENTION

This invention relates to improved liquid scintillation counters. In a particular aspect the invention pertains to improved sample vessels for liquid scintillation counters. In another aspect the invention contemplates sealing means for such sample vessels.

Scintillation counters have become important instruments for studying nuclear radiation. Such nuclear radiation can be made up of energetic particles possessing mass and charge, such as alpha, or beta radiation; of particles having mass and no charge, such as neutrons; or of particles having no mass and no charge, such as gamma radiation.

All of these forms of nuclear radiation interact with matter at the atomic level. This interaction results in disturbing the electron level of an atom with which the radiation particle comes in contact. The measurement of this interaction with matter is the principle around which all radiation counters are designed. Scintillation counters are designed so that the nuclear radiation interacts on a phosphor material. When the phosphor is disturbed it releases some of its disturbed or excited energy as photons. A photosensing device placed in close contact with the phosphor can detect the emitted photons and convert the photon energy to an electrical pulse.

There are two types of scintillation counters presently in use. One is used to measure gamma radiation. This form of radiation having no mass or charge does not readily react with matter. To enhance the interaction phosphors are utilized made up of inorganic crystals of high atomic number atoms, such as sodium or cesium iodide activated with thallium. The second type of counter is used to detect radiation having both mass and energy such as alpha and beta particles. A liquid phosphor in which the radioisotope is dissolved or suspended has been found to be the most effective means for detection. This form of counter is referred to as a liquid scintillation counter after the use of the liquid phosphor.

In liquid scintillation counting a beta or alpha radioisotope is placed in an aromatic solvent into which an organic phosphor is dissolved, the solvent and phosphor collectively being known as a cocktail. The cocktail container or sample vessel can be constructed of glass, pyrex, plastic, quartz and the like having good optical properties, and this sample vessel is referred to as a vial. The vial containing the radioisotope and cocktail is placed in a light-tight well opposite a photosensing device, or between two photosensing devices such as photomultiplier tubes, photodiodes and similar light detecting devices. On decay of the radioisotope in the vial, radiation particles emitted dissipate their ionizing energy into the molecules of the aromatic solvent surrounding the radioisotope. The radiation particles transfer their energy to the solvent molecules, which in turn transfer the energy to the phosphor. The phosphor receiving the transferred energy converts it into photoenergy which is emitted as photons through the walls of the vial. The photons activate the one or more photosensing devices. The photosensing devices, detecting the photon bursts originating from the radiation event, convert this photon energy to electrical pulses which record that a radioactive decay event has occurred within the vial.

Liquid scintillation counters are now the instruments of choice for use in beta decay counting and to a lesser degree, alpha counting, and they have even been modified to measure gamma, and both beta and gamma emissions of radioactive samples. While preferred, this mode of counting nevertheless still possesses certain disadvantages. Two of the main problems with liquid scintillation counters have been their inability to effect high photon detection from within the counting vial, particularly when using radioactive labelled material of photon adsorbing qualities, i.e., quenched samples, and their inability to retain volatile cocktail solvents within the instrument for relatively long periods — hours to days — frequently required for sample preparation and counting. Consequently, a need exists for a liquid scintillation vial possessing a more efficient means of emitting photons, preferably one which enhances photon emission, and a vial in which loss of volatile cocktail solvents is prevented. In accordance with this invention a liquid scintillation vial is provided having these improved efficiencies.

SUMMARY OF THE INVENTION

By the practice of this invention a liquid scintillation counter is provided having a sample vessel which increases photon impingement on the photosensing device of the instrument. A liquid scintillation counter sample vessel of the type adapted to be placed in a scintillation counter sample well opposite the face of a photomultiplier tube is provided having photon reflective surfaces positioned in the path of photons eminating in direction away from the photomultiplier tube, and disposed at angles to reflect photons in the direction of the photomultiplier tube face.

DETAILED DESCRIPTION OF THE INVENTION

To improve the efficiency of liquid scintillation counters means are provided for directing scattered photons within the vial, which in conventional liquid scintillation counters would not reach the photomultiplier tube face, back to the phototube. In addition a sample vessel closure means is provided to prevent escape of volatile materials. The invention can, perhaps best be understood from a description in conjunction with the accompanying drawings.

Figure 1:
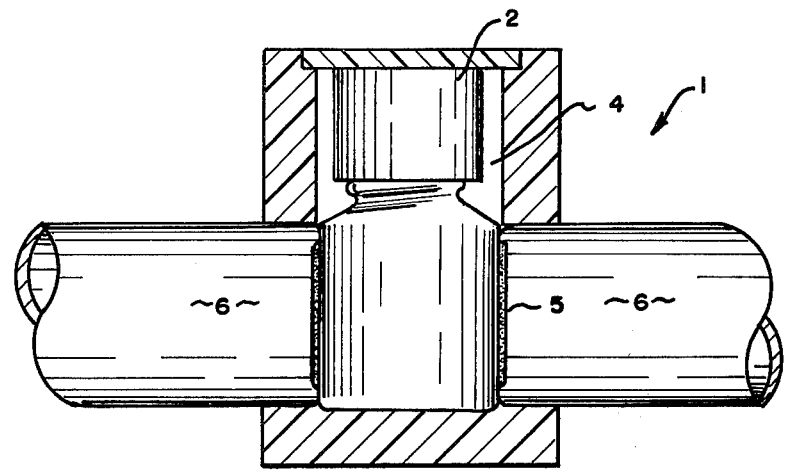
FIG. 1 is a diagrammatic representation showing a side view of a standard vial in a conventional two photomultiplier tube liquid scintillation counter.

Referring now to FIG. 1, a liquid scintillation counter, 1 is shown wherein a conventional sample vessel 2 is inserted into a well 4. It is known that in this apparatus a considerable number of the photons created by the action of the phosphor disappear randomly. Two photomultiplier tubes 6 are normally employed as illustrated in FIG. 1 to collect as large a quantity of the emitted photons from the vial as possible. However, even in instruments employing two photomultiplier tubes photons do not move toward the phototubes and are not detected or counted. This invention provides means for reducing the random dissipation of photons and for directing these photons to the phototubes. To accomplish this, a sample vessel or vial has been designed having reflective surfaces.

Figure 2:
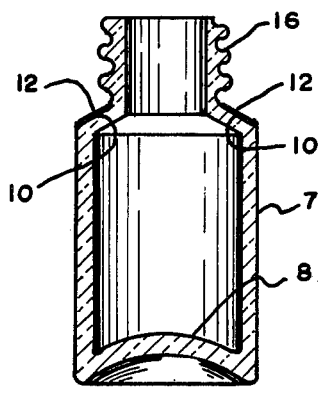
FIG. 2 is a view showing a cocktail vial possessing a raised bottom and photon-reflecting shoulders.
Figure 3:
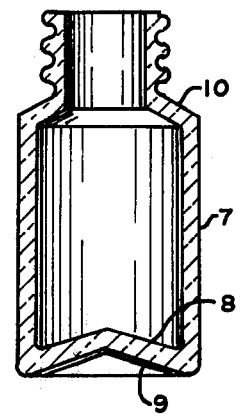
FIG. 3 is a similar to FIG. 2, but shows a sample vessel with a raised photon reflecting bottom.
Figure 4:
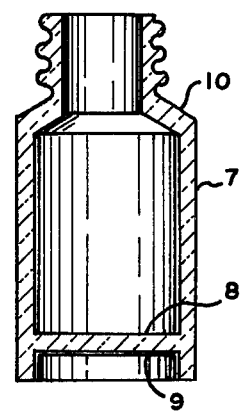
FIG. 4 is similar to FIG. 3 with another configuration of a raised photon reflecting vial bottom.

It has been found that a substantial quantity of photons which escape undetected travel in upwardly and downwardly directions. In one embodiment of this invention photons which move in the downward direction within a vial 7 can be effectively directed outwardly to the phototubes by providing flat, angular or upwardly convex vial bottom surfaces 8 coated or impregnated with a reflective material 9 as shown in FIGS. 3 and 4. It is also desirable to elevate bottom surface 8, as shown in FIGS. 2, 3, and 4 at least 4 mm, and preferrably higher for increased counting efficiency. The elevation of the bottom of the vial results in a more central positioning of the vial's cocktail media relative to the face 5 of the viewing phototube, and a higher photon detection results because the central portion of the phototube face is more efficient in photon detection than is its peripherial edge. The reflective angular or curved surfaces 8 of the bottom of the vial 7 enhance the photon transmission outwardly from within the vial.

In another embodiment of the invention photons which move upwardly within the vial are effectively directed outwardly by reflective top vial surfaces. This is accomplished by any of three means, a reflective cap base, a reflective cap inner sealing element, or by the sample vial shoulders. As illustrated in FIG. 2 the shoulder 10 of vial 7 can be angled and its external surface can be coated with a photon reflective material 12.

Figure 5:
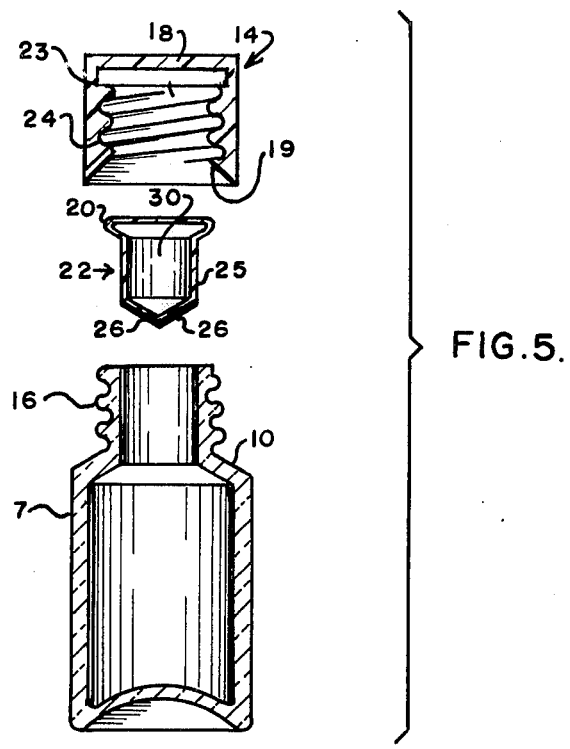
FIG. 5 is a view showing a top reflector sealing cap for a scintillation vial.
Figure 6:
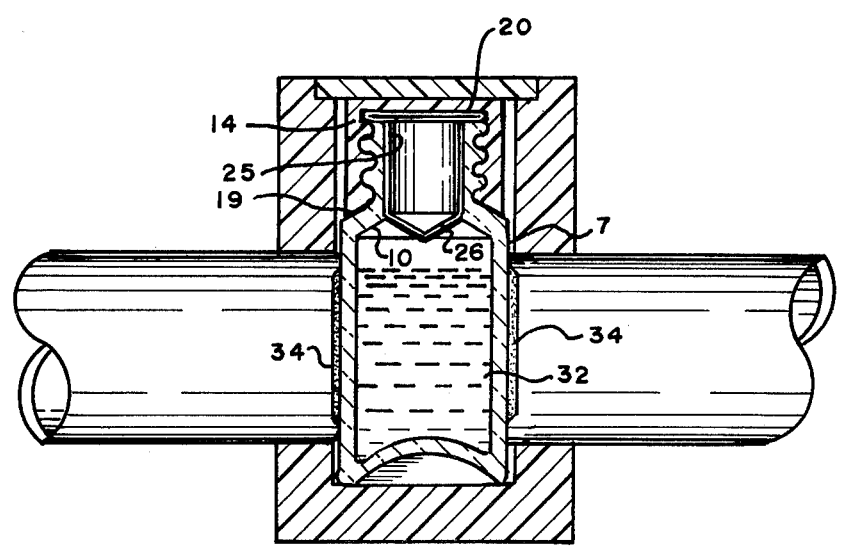
FIG. 6 shows a preferred embodiment of the invention.

Referring now to the bottle top closure means shown in FIG. 5, the closure includes two elements, a cap 14 and an inner sealing element 22. Cap 14 is in the form of a housing member 18 provided with threads 24 mating with bottle threads 16 so that the cap fits over the neck of the sample vessel. The cap 14 is made of a nonflexible plastic or metal, and has a compression chamber 23 fabricated in its innermost top such that the compressed reflector-expansion seal shoulder 20 of closure element 22 can initially be fixed thereto or held thereby. Sufficient room is allowed for shoulder 20 to expand as will be explained shortly. A unique feature of sealable cap 14 is that the cap base 19 is angled and widened to extend down over and thereby cover the angular shoulder 10 of vial 7 as shown in FIG. 6. The cap base 19 is rendered reflective and thereby acts as a reflector of photons in lieu of shoulder 10 of the vial.

The inner sealing element 22 carried by cap 14 is a reflector-expansion seal employed to reflect upwardly directed photons to a side-viewing phototube. On compression as cap 14 is tightened the reflector-expansion seal functions as an O-ring to seal the vessel as can be visualized from FIG. 6. In addition, as cap 14 is further tightened, added pressure is placed on shoulder 20 by the top of the vial. The reflector seal shoulder compresses under this pressure, and the air therewithin is forced to the flexible side walls 25 of the reflector seal causing the walls to expand against the inner wall of the sample vial neck, thus forming an additional seal. The reflector-seal 22 is made of a flexible reflective plastic and is provided with shaped, flat, angular surfaces 26 to reflect photons to photomultiplier tubes.

The angular vial and cap surfaces rendered reflective according to this invention can be coated, or impregnated during fabrication, with any of the well known photon reflective materials. Preferred materials are applied coatings of metal oxides, for instance, of barium or titanium oxide. However, flash evaporated metals, such as aluminum and the like can also be employed. In coating the outer surfaces of the vial bottom with the reflecting materials, frosted or etched vial surfaces will enhance both the reflective qualities and the adherance of the reflective material, especially if the vial material is quartz, pyrex or glass. Materials found to be superior for construction of the vial top are plastics such as white finished urea, linear polyethylene, and the like, and various metals. Vial construction is best effected using glass, pyrex and various plastics such as nylon, linear polyethylene and the fluoroplastics (Teflons). Inner sealing element 22 is fabricated using a flexible plastic, e.g., polyethylene and polycarbonate.

In a preferred embodiment of this invention all three surfaces, that is, the elevated vial bottom 8, the cap base 19, and the inner sealing element 22 are utilized to reflect and thereby reduce random dissipation of photons. This embodiment of the invention is shown in FIG. 6. Using this preferred embodiment the liquid cocktail 32 and the radioactive material to be measured are placed in the sample vial 7, and the compression cap 14 is screwed onto the vial. As cap 14 is tightened, the uppermost ridge surface of the threads of the vial comes in contact with the sealing elements's collapsible shoulder 20. The vial is sealed as explained previously, and the angular reflective surfaces 26 of the seal now extend to the shoulder within the counting vial 7 and are in a position to reflect photons. Photons are also reflected for phototube detection by the widened base 19 of the vial cap, the base extending across the shoulder 10 of the vial. The collection of photons which are emitted in a downward direction within the vial is also improved herein. These photons do not travel out of the view of the phototube because of the more central positioning of the cocktail in relation to the viewing tubes. The curved and/or angular reflective coated surfaces 9 of the bottom of the vial are positioned at a reflective angle which further assures photon emission and phototube collection.

The manufacturers of commercial liquid scintillation counters have standardized the sample vessel, and hence are using a standard-size vial whose dimensions are 60 mm in height and 28 mm in diameter so as to minimize problems with vial instrument interchange. This invention contemplates such a vial, readily usable in a standard manufactured liquid scintillation counter. However, I have also perfected small vials of 45 mm height and 14 mm diameter with reflective surfaces and a raised bottom. These vials have been found to give outstanding sealability and superior counting efficiency.

As a specific example of the invention, readings were taken from a conventional two-tube liquid scintillation counter, FIG. 6. These values were recorded with a Nuclear Chicago Liquid Scintillation Counter, Model No. 4534 using a balanced point discriminator setting for radiocarbon with the lower discriminator set above the E max. energy for tritium. The radioactive samples were made up using radiocarbon labelled toluene in a cocktail of 5 grams of 2, 5 diphenyl oxazole (PPO) dissolved in 1 liter of toluene. Standard commercial glass vials and modified sealable vials with the improvements previously described were utilized for data presented in Table 1.

TABLE I

| LSC Vial Description | Radiocarbon Counting Efficiency |
|---|---|
| 1) Standard unmodified vial | 72% |
| 2) Modified sealable reflector top with standard unmodified vial | 78% |
| 3) Modified sealable reflector top with raised convex reflector bottom vial | 83% |

It can be seen that use of the sample vessel of this invention leads to a definite improvement in readings, indicating an overall radiocarbon counting efficiency. Increases of 11% can be readily attained. It is to be understood that the improved vials described herein are not limited solely to counting radiocarbon, but can be applied to other raidoisotopes routinely counted in liquid scintillation counters with an added advantage of higher counting efficiency. Sealability of the liquid scintillation vials with the cap seal described herein using a toluene solvent showed a solvent cocktail loss of only 4.8 mg for a two day period, whereas standard unmodified vials of commercial make all showed considerable more loss of solvent on standing for a comparable period of time.

Vairations and ramifications will, of course, occur to those skilled in the art. Thus, if increased sealability is indicated, void space 30 within closure element 22 can be filled with air under pressure and completely sealed. In addition, other reflective sealing means configurations will occur to those skilled in the art. Such modifications are deemed to be within the scope of this invention.

What is claimed is:

1. In a liquid scintillation counting apparatus having a sample vessel of the type adapted to be placed in a counter sample well opposite the face of a photosensing device, a sample vessel having an angular surface, a photon reflecting material on said angular surface, said angular surface being positioned in the path of photons emitted in a direction away from the photosensing device, and said angular surface being disposed to reflect photons thus emitted back to the face of the photosensing device to reduce random dissipation of photons.

2. The sample vessel of claim 1 wherein the angular surface is impregnated to render it reflective.

3. The sample vessel of claim 1 wherein the angular surface is coated to render it reflective.

4. The sample vessel of claim 1 wherein the photon reflecting material is an oxide of barium or titanium.

5. The sample vessel of claim 1 wherein the photon reflecting material is flash evaporated aluminum.

6. The sample vessel of claim 1 wherein the angular reflective surface is the sample vessel shoulder.

7. The sample vessel of claim 1 wherein the angular reflective surface is the base of a vessel cap covering the vessel shoulder.

8. The sample vessel of claim 1 wherein the angular reflective surface is the base of an inner expansion seal within a vessel cap.

9. The sample vessel of claim 1 having three angular reflective surfaces, an elevated vessel bottom, the base of a vessel cap covering the vessel shoulder, and the base of an inner expansion seal within the vessel cap.

10. The sample vessel of claim 1 fabricated of glass, pyrex, quartz or plastic.

11. The sample vessel of claim 1 fabricated of polyethylene, nylon or fluoroplastic.

12. The sample vessel of claim 1 wherein the angular reflective surface is an elevated vessel bottom.

13. The sample vessel of claim 12 wherein the bottom is elevated at least 4 mm in height above the base of the vessel.

14. A cap for a liquid scintillation counter sample vessel with a threaded neck having both inside and outside cylindrical neck and shoulder surfaces comprising a threaded rigid housing member adapted to fit on the outside neck and shoulder surfaces of the sample vessel and to tighten thereon; a flexible inner sealing element adapted to be carried within the housing member; said inner sealing element having (a) a collapsible shoulder adapted to be compressed on tightening the housing member, and (b) a cylindrical base member integral with the shoulder and adapted to fit slideably along the inside cylindrical sample vessel neck surface; said inner sealing element being pressurized within so that the base member expands against the inside neck surface on compression of the collapsible shoulder.

15. The cap of claim 14 wherein the housing member contains a compression chamber adapted to receive the collapsible shoulder to carry the inner sealing element.

16. The cap of claim 14 fabricated of white finish rigid urea-aldehyde resin.

17. The cap of claim 14 fabricated of metal.

18. The cap of claim 14 wherein the inner sealing element is provided with photon reflecting surfaces.

19. The cap of claim 14 wherein the inner sealing element shoulder is adapted to collapse under cap compression to function as an O-ring to seal the sample vessel opening.

20. The cap of claim 14 wherein the base of the housing member, and the base of the inner sealing element are photon reflective surfaces.

* * * * *